(12) United States Patent
McNerney et al.

(10) Patent No.: US 9,514,560 B2
(45) Date of Patent: Dec. 6, 2016

(54) ARBITRARY HIERARCHICAL TAGGING OF COMPUTER-GENERATED ANIMATION ASSETS

(71) Applicant: DreamWorks Animation LLC, Glendale, CA (US)

(72) Inventors: Peter McNerney, Glendale, CA (US); Evan P. Smyth, Glendale, CA (US)

(73) Assignee: DreamWorks Animation LLC, Glendale, CA (US)

( * ) Notice: Subject to any disclaimer, the term of this patent is extended or adjusted under 35 U.S.C. 154(b) by 0 days.

(21) Appl. No.: 13/844,315

(22) Filed: Mar. 15, 2013

(65) Prior Publication Data

US 2014/0267308 A1    Sep. 18, 2014

(51) Int. Cl.
*G06T 13/20* (2011.01)
*G06T 13/00* (2011.01)
*G06F 17/30* (2006.01)

(52) U.S. Cl.
CPC ............... *G06T 13/20* (2013.01); *G06T 13/00* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 5,923,330 A | | 7/1999 | Tarlton et al. |
| 6,154,213 A | * | 11/2000 | Rennison et al. ............ 715/854 |
| 6,317,142 B1 | | 11/2001 | Decoste et al. |
| 6,329,994 B1 | | 12/2001 | Gever et al. |
| 7,821,516 B2 | * | 10/2010 | Bugaj et al. .................. 345/473 |
| 8,127,236 B2 | | 2/2012 | Hamilton, II et al. |
| 8,151,191 B2 | | 4/2012 | Nicol, II |
| 8,624,898 B1 | * | 1/2014 | Bugaj et al. .................. 345/440 |
| 2003/0179204 A1 | | 9/2003 | Mochizuki et al. |
| 2007/0208685 A1 | * | 9/2007 | Blumenau ......... G06F 17/30997 |
| 2007/0299867 A1 | * | 12/2007 | Baldwin et al. .......... 707/103 R |

(Continued)

FOREIGN PATENT DOCUMENTS

| | | |
|---|---|---|
| EP | 1429291 A1 | 6/2004 |
| FR | 2874724 A1 | 3/2006 |
| KR | 10-0927326 B1 | 11/2009 |

OTHER PUBLICATIONS

MSDN, "Gamer Avatar", available online at <http://msdn.microsoft.com/en-us/library/bb975583.aspx>, retrieved on Feb. 20, 2013, 4 pages.

(Continued)

*Primary Examiner* — Jacinta M Crawford
*Assistant Examiner* — Diane Wills
(74) *Attorney, Agent, or Firm* — Morrison & Foerster LLP (57) ABSTRACT

Systems and methods for using hierarchical tags to create a computer-generated animation are provided. The hierarchical tags may be used to organize, identify, and select animation assets in order to configure animation parameters used to render a computer-generated image. The hierarchical tags may be used to display representations of animation assets for selection. A hierarchy based on the hierarchical tags may be represented by a tree structure. The hierarchical tags may be used as part of a rule to partition animation assets. In this way, the hierarchical tags may advantageously be used to identify, organize, and select animation assets and perform animation processes.

21 Claims, 10 Drawing Sheets

(56) References Cited

U.S. PATENT DOCUMENTS

2008/0215995 A1    9/2008  Wolf
2009/0113350 A1*   4/2009  Hibino et al. ................ 715/853
2009/0156907 A1    6/2009  Jung et al.
2009/0193034 A1*   7/2009  Hirasaki ...................... 707/100
2010/0131864 A1    5/2010  Bokor et al.

OTHER PUBLICATIONS

"Unity Asset Pipeline, GameObjects and Components", Aug. 14, 2012, Online available at: <http://3dgep.comjintroduction-to-unity-3-5-part-2/>, 10 pages.
Extended European Search Report received for European Patent Application No. 14160135.1, mailed on Sep. 12, 2014, 7 pages.

* cited by examiner

ARBITRARY HIERARCHICAL TAGGING OF COMPUTER-GENERATED ANIMATION ASSETS

BACKGROUND

1. Field

The present disclosure relates to computer-generated animation and, more specifically, to tagging computer-generated animation assets using arbitrary hierarchical tags.

2. Related Art

A computer-generated animation is typically created by rendering a sequence of images, with each image depicting a computer-generated scene composed of one or more computer-generated animation assets (hereafter "animation assets"). An animation asset refers to an object in a computer animation, such as a character, a car, a tree, a building, and the like. Light sources, materials, textures, and other visual effects may be associated with the animation assets to create realistic lighting effects for the computer-generated scene. Properly implementing these visual effects can involve configuring large amounts of data used by numerous external animation processes, such as rendering, shading, rasterizing, lighting, and the like. Lighting processes may include shadowing calculations, reflection calculations, transmission calculations, and the like. Managing the configuration data and external animation processes can be difficult due to the large amount of data and large number of processes required to produce computer-generated animations and the complex dependencies that exist among them.

For example, film production lighting typically requires an artist to configure tens to thousands of inputs or parameters for each shot in a computer-generated animation. For example, an artist called a lighter may be required to select one or more light sources (e.g., ambient light source, point light source, spotlight, or the like) used to illuminate the computer-generated scene as well as configure surface shaders to simulate the optical properties (e.g., color, texture, specular properties, subsurface light scattering effects, and the like) of each surface of each animation asset in that scene. Thus, the appearance of an animation asset in the scene depends on, among other things, the one or more light sources and the outputs of the external shading processes used to simulate the optical properties of the various surfaces of that animation asset.

As more parameters and animation assets are added to the scene, the process of configuring the scene becomes exceedingly complex. To make the process more manageable, an artist may choose to work on only a subset of animation assets at a time.

It is therefore desirable to create a system to efficiently identify, organize, and select groups of animation assets for further animation work.

SUMMARY

Processes for creating a computer-generated animation using hierarchical tags are described. One example process may include receiving a first user input representing a tag, wherein the tag is a string and the tag indicates a position within a hierarchy; associating an animation asset of a plurality of animation assets with the tag; displaying a representation of the animation asset associated with the tag, wherein the representation of the animation asset is displayed based on the tag; receiving a second user input representing a selection of one or more animation assets of the plurality of animation assets; obtaining, in response to the second user input, the selected one or more animation assets; and displaying the selected one or more animation assets. In some examples, an animation process, such as a rendering process, lighting process, shading process, or rasterizing process, is performed on the selected one or more animation assets. In some examples, a user selection of a visual lighting effect is received for the selected one or more animation assets, and an image of the selected one or more animation assets is rendered based on the selected visual lighting effect.

In some examples, one or more animation assets of the plurality of animation assets are each associated with a tag, and a tree based on the animation assets associated with a tag and their associated tags is displayed. The tree may correspond to the hierarchy.

In some examples, a representation of a first animation asset at a first node of the tree and a representation of a second animation asset at a second node of the tree are displayed. The display of the representation of the first animation asset at the first node and the display of the representation of the second animation asset at the second node may be based on the tags associated with the first animation asset and the second animation asset. When the tag of the first animation asset and the tag of the second animation asset begin with a common substring, the first node and the second node of the tree may have the same parent node.

In some examples, a search rule and a search string are received, a plurality of tags is searched based on the search rule and the search string, and at least one animation asset is obtained based on the search.

Systems and computer-readable storage media for creating a computer-generated animation using hierarchical tags are also described.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

For descriptive purposes, throughout this disclosure, software, software modules, software assets, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules or assets by executing computer instructions provided by the software modules or assets.

As mentioned above, a computer-generated animation is typically created by rendering a sequence of images, each image depicting a computer-generated scene composed of one or more animation assets. Light sources, materials, textures, and other visual effects may be associated with the animation assets to create a realistic visual appearance for the computer-generated scene. For purposes of this discussion, a computer-generated scene generally refers to the three-dimensional space that is able to be filmed using a virtual camera, and may also be referred to generically as a scene.

Various embodiments are described below relating to hierarchical tags for identifying, organizing, and/or selecting animation assets used to render a computer-generated image. A tag is a piece of metadata, such as a string, that an artist may assign to an animation asset to identify the animation asset. A tag may also form a hierarchy to further categorize animation assets. Hierarchical tags may advantageously be used to organize animation assets so that an artist may select a subset of animation assets for editing, thus making the editing process more manageable and efficient.

Figure 1:
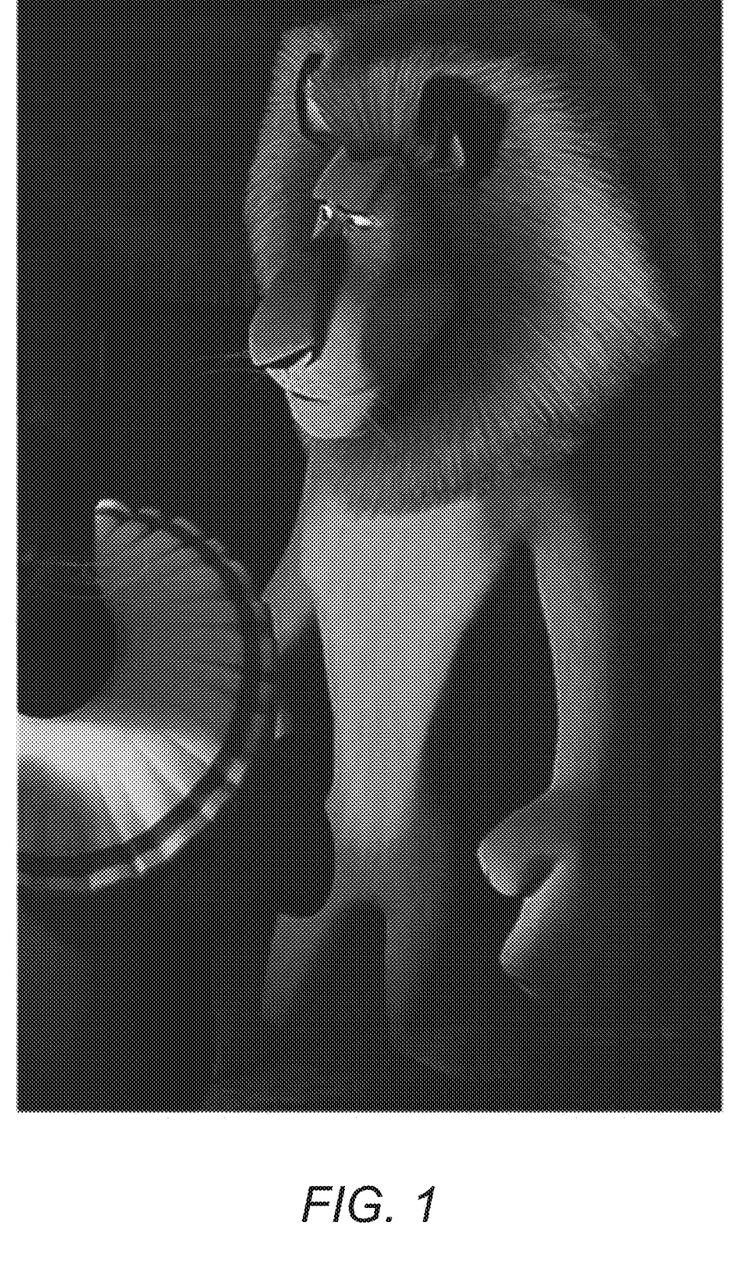
FIG. 1 illustrates an exemplary rendered image.

FIG. 1 depicts an exemplary rendered computer-generated image 100. To create such an image, an artist typically configures light sources, shaders, and the like to produce the desired effect.

Figure 2:
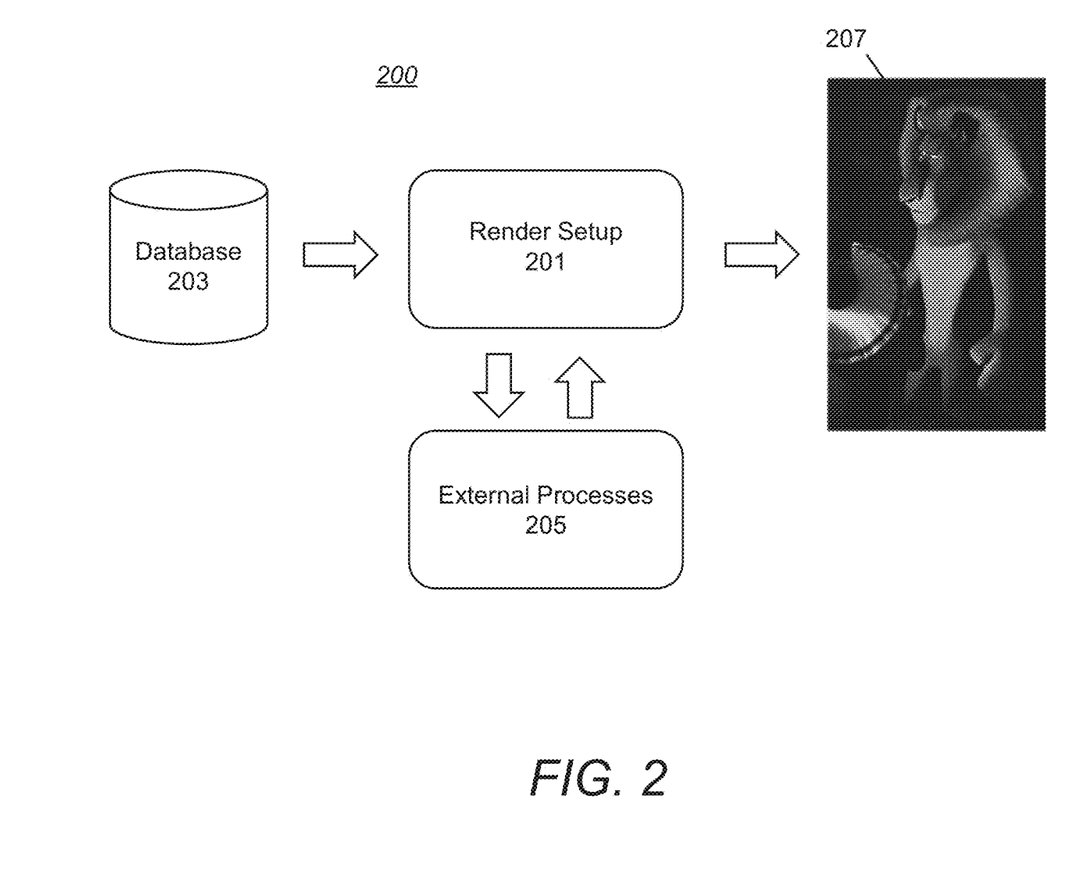
FIG. 2 illustrates the operation of an exemplary render setup used to render an image.

FIG. 2 illustrates the operation of an exemplary render setup system 200 that can be used to configure and manage configuration data as well as external animation processes used to render the computer-generated image 207. Render setup 201 may receive data, such as animation assets, animation asset configuration data, and the like from database 203, which may include a centralized or decentralized computer-storage database made up of one or more local and/or remote computer-storage databases that can be accessed by one or more users. Using a centralized storage database may improve storage efficiency and may help ensure that the rendering of a computer-generated animation is performed using a common version of the animation assets.

The animation asset data received from the database 203 may include data in any format that represents the set of animation assets (e.g., characters, plants, buildings, etc.) that may be used to render an image. For example, the animation asset data may include surface and/or volumetric representations of the animation assets, identification of parts that make up the animation assets, and the like. In some embodiments, the set of animation assets may include animation assets that are to be displayed within an image as well as those contained in the database that are not displayed within the image.

1. Hierarchical Tags

The complexity of a scene increases with the number of animation assets contained in the scene. The increased number of animation assets can create problems organizing the animation assets, which makes animation asset configuration and rendering setup, e.g., lighting configuration, more difficult and time consuming.

One solution to the organization problem is to use a traditional containment hierarchy to organize animation assets. A containment hierarchy is a hierarchy in which each item is confined to a single container. Thus, if an item is already in a container, it cannot be added to another container without removing it from the first. Containment hierarchies, however, have limited usefulness in the context of computer animation. For instance, a scene layout may be created such that it contains a city with a number of city-blocks within that city and a number of buildings within each block, and so on. A street may run through several cities or through multiple city-blocks within a city. The one-to-many relationship between such a street and the multiple cities/city-blocks does not lend itself to organization within a containment hierarchy.

Additionally, in a containment hierarchy an item's container must be located in order to find the item itself. Thus, finding an item requires an understanding of the global structure of the containment hierarchy. Also, locating an item may be particularly cumbersome when the item is buried deep within a hierarchy.

A flexible tagging capability may provide another solution to the organization problem. Tagging of animation assets according to this disclosure provides for the definition of useful organizational hierarchies without any requirements of global visibility of context. An artist may make it possible to find an animation asset without having to find the containing entity by making the relative location of the animation asset in a hierarchy local to the artist. The present disclosure provides for presentation of animation assets in an arbitrary number of convenient hierarchical structures. The structure of the hierarchy may also be arbitrary in that the hierarchical levels are not predefined. Hierarchical tagging allows an artist to tailor the categorization and hierarchy of animation assets based on specific needs, using the artist's own terminology, without being constrained by the containment issues discussed above.

Tagging allows an artist to tag animation assets that contain editable information so that the artist can efficiently select and load just animation assets of interest in order to configure an animation scene with the minimum number of animation assets required for the artist's design purpose. As a result, the time and processing required for rendering the image is reduced, allowing more efficient scene design.

A tag is a piece of metadata that an artist may assign to an animation asset to identify the animation asset. In one embodiment, a tag may be a string. For example, an animation asset representing a person may be assigned a tag such as "big_crowd" to indicate that the person is part of a crowd in a virtual scene.

Although a tag may describe a property or characteristic of an animation asset, the choice of tags may be completely arbitrary. Despite the arbitrary nature of tags, conventions and rules for creating tags may be implemented to make tags more meaningful among different users and make the computer-generated animation design system more effective.

Another feature of tags is that multiple animation assets may have the same tag without restriction (i.e., associating a tag with one animation asset does not prevent application of the same tag to another animation asset). Also, an animation asset may have multiple different tags. For example, the lion depicted in computer-generated image 100 in FIG. 1 may be associated with the tag "animal" and the tag "fur." Depending on the elements of the scene being configured, one artist may be interested in the lion because it is an animal, while another artist is concerned about all animation assets that have fur. In this way, tagging can accommodate the needs of multiple artists without one artist interfering with the other.

Figure 3A:
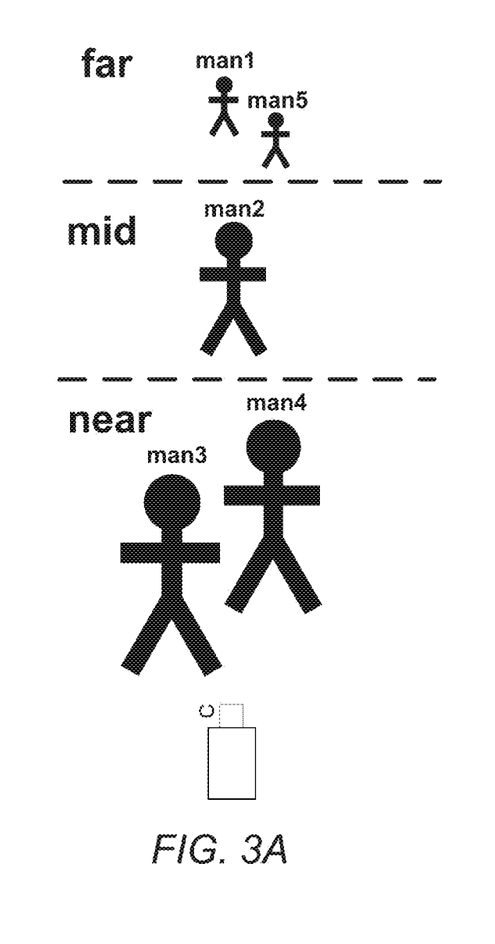
FIGS. 3A-B illustrate an exemplary set of animation assets and a hierarchical structure including the animation assets.

Tags may also be used to define a hierarchy. FIG. 3A illustrates a scene containing five animation assets representing a crowd of people. An artist may want to work on a scene that contains all five people in the crowd, or alternatively, the artist may want to work on subsets of the crowd based on their distance from the virtual camera. The scene in FIG. 3A is divided into three regions: near, mid, and far. Each animation asset may be assigned two tags: one indicating that it is part of the crowd (e.g., "big_crowd") and another indicating its distance from the camera (e.g., "mid"). The tags may be delimited to create a hierarchy. For example, the colon character ":" may denote a level transition in the hierarchy. According to this notation, the string "big_crowd:mid" represents a two-level hierarchy in which sub-string "big_crowd" is a tag that represents a root level and sub-string "mid" is a tag that represents a sub-level within "big_crowd." The tags "far" and "near" may also be used to define sub-levels underneath "big_crowd." When used in this way, the tags represent a position or level within a hierarchical structure and therefore may be referred to as hierarchical tags. Also, although the delimited tags discussed above are described as separate tags, the combined delimited string may be referred to as a single hierarchical tag containing sub-tags. Further, other syntax or schemes may be used to indicate a transition between levels or to represent a hierarchy.

Figure 3B:
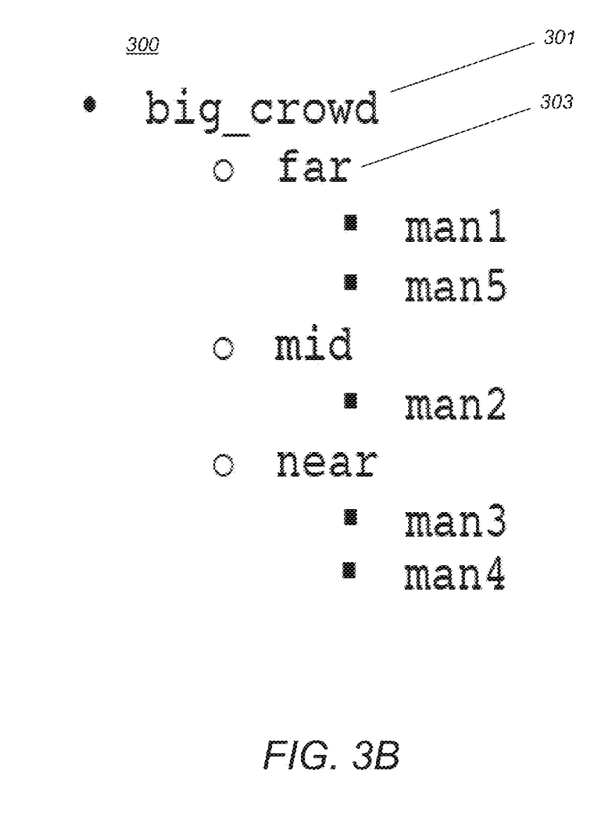

FIG. 3B illustrates an exemplary hierarchy of the crowd shown in FIG. 3A. Each animation asset has an asset name (man1, man2, etc.). When the respective hierarchical tags are assigned to each animation asset (e.g., "big_crowd:far" is assigned to animation assets man1 and man5), the hierarchy may be represented by the tree structure 300 illustrated in FIG. 3B. As shown, animation asset man1 is represented under the node "far" 303, which has parent node "big_crowd" 301. Because the tag of each asset begins with the same string (i.e., big_crowd), the nodes representing distance from the camera all have the same parent node. Also, if hierarchical levels existed between "big_crowd" and the tags indicating distance, then intermediate nodes may also be included. By displaying the hierarchy 300 to an artist on a graphical user interface, the artist may easily locate and select a desired group of animation assets for editing or animation processing. This feature of the hierarchical tagging scheme is discussed further in the description of FIGS. 7-10.

The proposed hierarchical tagging scheme supports arbitrary hierarchical presentations of animation assets. Because the tags themselves may be arbitrarily named, and multiple hierarchical tags may be used together to form a multilevel hierarchy, it follows that the hierarchies are also arbitrary. Also, for the purposes of this disclosure, a sole tag may represent a single-level hierarchy and therefore may also be properly referred to as a hierarchical tag.

As described, a hierarchical tag may act as a non-restrictive attribute of an animation asset. Thus, a particular animation asset may appear in each of an arbitrary number of hierarchies. For example, animation asset man1 in FIG. 3A may be associated with another crowd using the tag "large_crowd:close" if a different artist chooses to give the crowd a different name or break up the crowd differently. An animation asset may appear up to once in a hierarchy. Alternatively, it is possible that an animation asset may appear an arbitrary number of times in the same hierarchy.

2. Creating Hierarchical Tags

Figure 4:
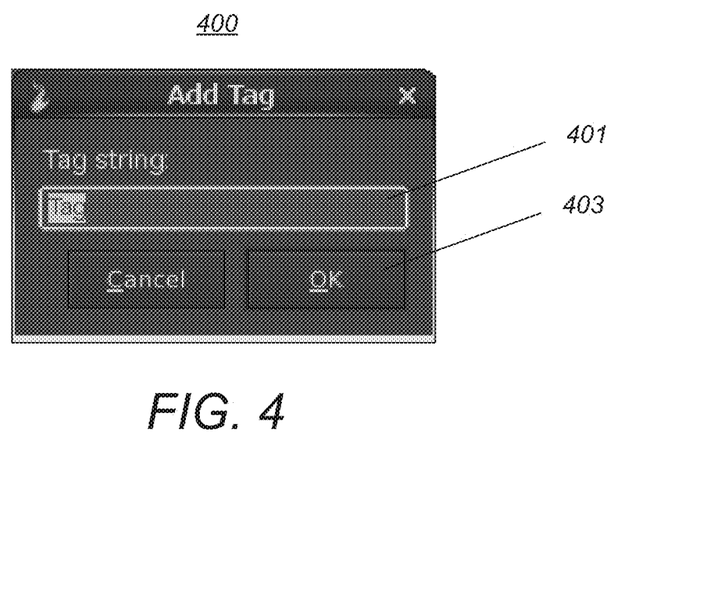
FIG. 4 illustrates an exemplary graphical user interface that may be used to add a hierarchical tag to an animation asset.

FIG. 4 illustrates an exemplary graphical user interface 400 for adding a tag to an animation asset. User interface 400 may include a text input box 401 for entering a text string representing a hierarchical tag. The user interface may further include a button 403 causing the hierarchical tag to be associated with the animation asset when pressed.

Figure 5:
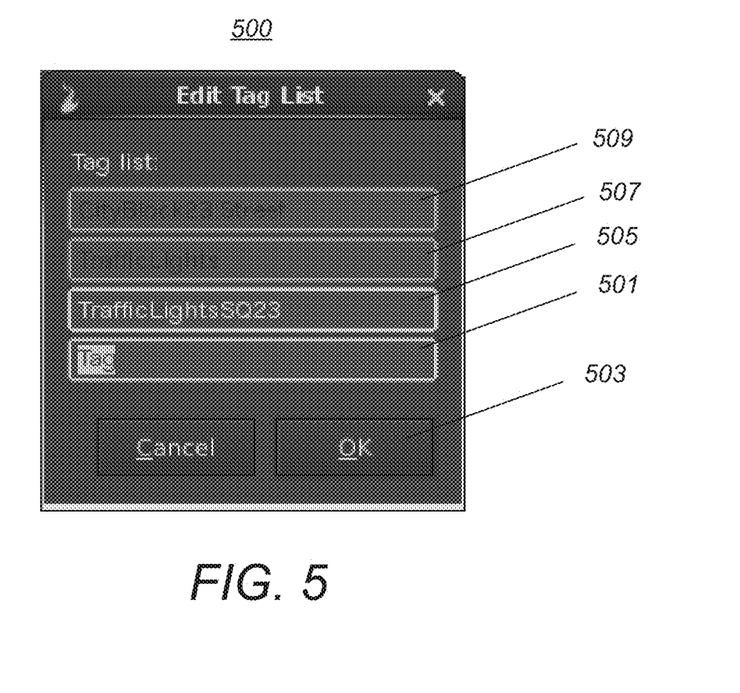
FIG. 5 illustrates an exemplary graphical user interface that may be used to edit and/or add a hierarchical tag to an animation asset.

FIG. 5 illustrates an exemplary graphical user interface 500 for editing and adding a hierarchical tag. Similar to user interface 400, user interface 500 may include a text input box 501 for entering a text string representing a hierarchical tag and a button 503 causing the hierarchical tag to be associated with the animation asset when pressed.

The user interface 500 is also configured to allow a user to modify hierarchical tags associated with an animation asset. As shown in FIG. 5, a user may either edit the existing tag "TrafficLightsSQ23" displayed in white text in text box 505 or add a new tag to the animation asset in text box 501. The animation asset associated with the tag list in FIG. 5 includes the tags "CityBlock23:Street," "TrafficLights," and "TrafficLightsSQ23." These tags may associate the animation asset with a street that is in city block number 23, as a traffic light, and as a traffic light in square 23, respectively.

In one embodiment, any of the existing tags may be edited. Alternatively, the ability to edit certain tags may be restricted. For example, in the Edit Tag List shown in FIG. 5, the two hierarchical tags in boxes 507 and 509 are displayed in black text indicating that they cannot be edited. A tag may be unavailable for editing for a variety of reasons. For example, a tag may be provided as part of the fundamental definition of an animation asset. In some embodiments, hierarchies delivered from upstream editing processes (i.e., before lighting design) cannot be modified, allowing upstream departments to ensure that any presentations they specify will be available to artists exactly as delivered. In another embodiment, a tag may be changed if the tag was added at the current editing level, but not if the tag was added in a preceding level. Intentional restriction allows an upstream artist to deliver useful hierarchical structure or grouping while custom tags may be added at other levels as desired. Thus, upstream-delivered organization remains visible to all downstream consumers without being modified, while allowing a downstream process to add additional animation assets to the basic hierarchy as delivered from upstream.

It should be noted that the order of the tags in a list is unimportant because of the arbitrary nature of the tags. For example, the tags may simply be listed in the order in which they were created. Alternatively, non-editable hierarchical tags may be listed above editable tags as in FIG. 5.

3. Selecting Animation Assets

Figure 6:
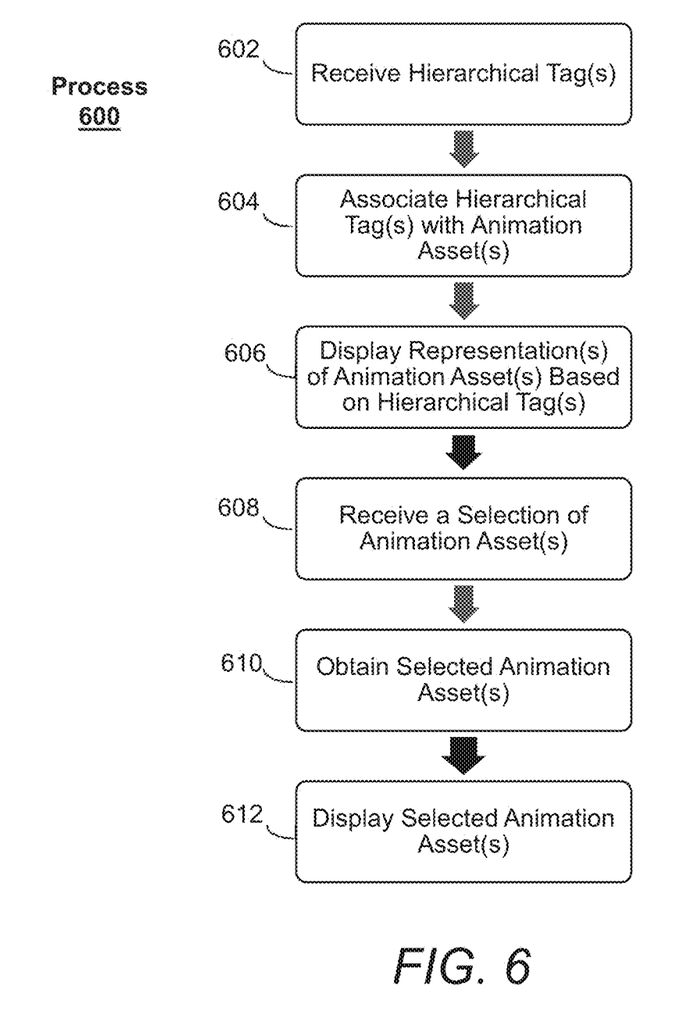
FIG. 6 illustrates an exemplary process for selecting and displaying an animation asset for use in a computer-generated scene.

FIG. 6 illustrates an exemplary process 600 for using hierarchical tags to select animation assets for configuring a computer-generated scene according to various embodiments. At block 602, a hierarchical tag is received. For example, a processor may cause a user interface like graphical user interface 400 or 500 for creating and/or modifying a hierarchical tag to be displayed on a monitor or other display device. The processor may then receive a user may input of a string representing a hierarchical tag. At block 604, the hierarchical tag is associated with an animation asset. For example, a user may cause the association by pressing a button on a user interface like 400 or 500.

At block 606, a representation of the animation asset may be displayed based on the hierarchical tag. The representation may be, for example, an icon or the like that is indicative of the animation asset. There are various ways in which the display may be based on the hierarchical tag. The displays discussed in the description below of FIGS. 7-10 provide possible examples.

At block 608, a selection of animation assets is received. For example, a user may select animation assets from a displayed list. A list may include the animation assets displayed at block 606 and/or other animation assets that may not be associated with hierarchical tags. A user may make this selection using any known selection means, such as clicking on the animation asset, dragging the animation asset to an editing portion of a graphical user interface, or the like.

At block 610, the selected animation assets are obtained. The animation assets may be obtained from a database similar or identical to database 203. Asset configuration data that are associated with the animation assets, such as the visual properties and looks for an animation asset, may also be obtained. In some embodiments, a processor may obtain the selected animation asset and may cause a visual representation of the animation asset to be displayed.

At block 612, the selected animation assets are displayed. Displaying the selected animation assets may allow a computer-generated scene that includes the selected animation assets to be configured. Displaying the selected animation assets may include loading the obtained animation asset information into an editing program used by an artist to configure a computer-generated scene and/or set rendering parameters. For example, light sources, materials, textures, and other visual effects may be associated with the animation assets to create realistic effects for the computer-generated scene.

In addition to the steps described in process 600, a computer-generated image may be rendered based on the selected animation assets and their configuration data. Rendering the image may include performing one or more animation processes on the subset of animation assets using selected visual effects. The animation processes may include processes such as rendering, shading, rasterizing, lighting (e.g., shadowing calculation, reflection calculation, transmission calculation), or the like that the animator, artist, or other user may want to perform on the animation assets to produce a computer-generated image of a scene.

A key feature of process 600 is that tag information is available to an interface before an animation asset is obtained so that the tag hierarchy may be presented before animation assets in the hierarchy are loaded. This process is intended to improve selection management so that only desired animation assets are loaded. Once animation assets are selected, asset configuration data that are associated with the animation assets, such as the visual properties and looks for an animation asset, may also be obtained.

4. Presentation of Hierarchical Tags

As mention above, hierarchical tag information for an animation asset may be made available before an animation asset is loaded into an editing program, which allows for presentation of a hierarchy without loading the animation assets. Hierarchical display prior to loading is advantageous for conserving resources and reducing editing time. Hierarchical tags also allow animation assets to be organized and displayed according to the artist's preferences, which also makes the editing process more efficient.

Figure 7:
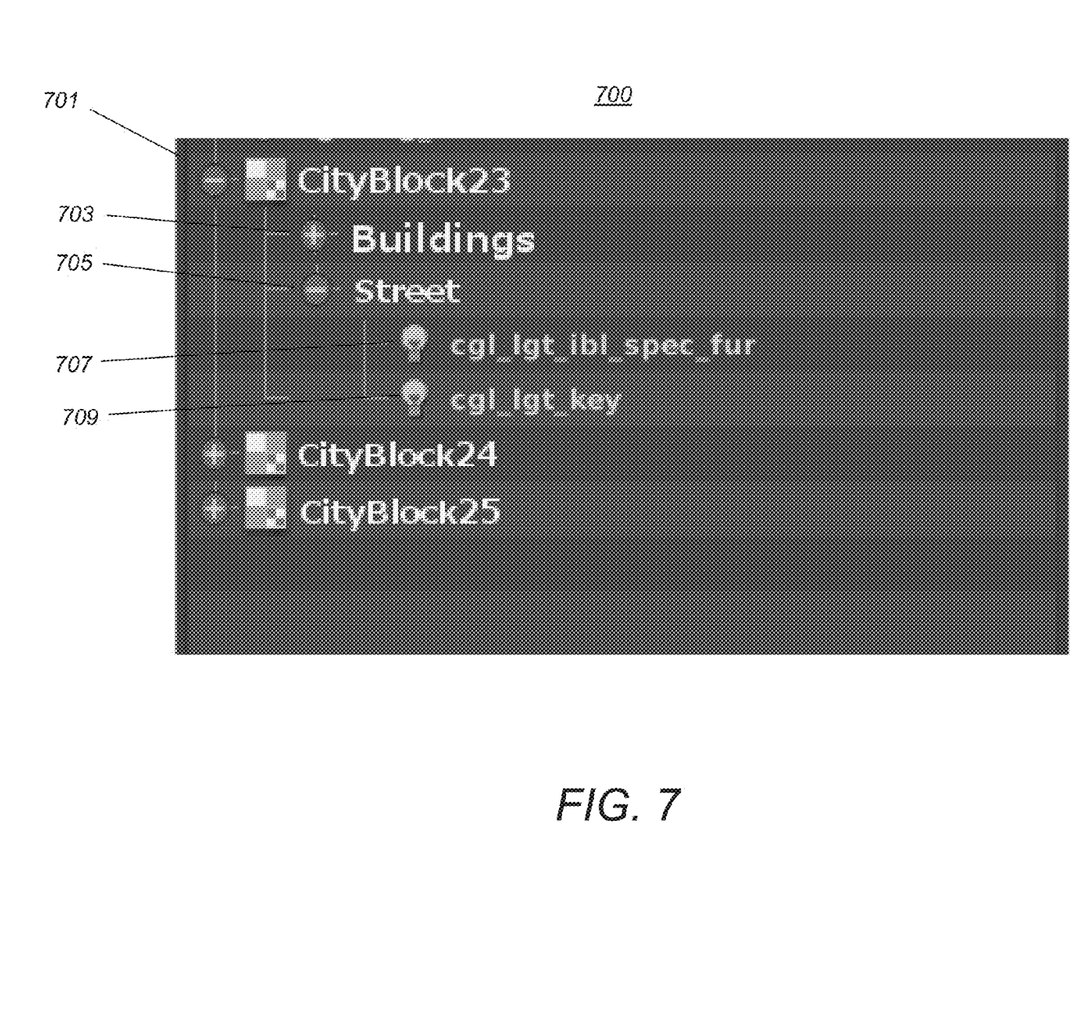
FIG. 7 illustrates an exemplary tree format of a hierarchical structure of animation assets.

Hierarchical tags may be displayed along with their associated animation assets in a format that simplifies group selection of animation assets. FIG. 7 illustrates an exemplary graphical user interface 700 displaying a collapsible/expandable tree of hierarchical tags. Each level of a hierarchy may be expanded or collapsed. If the level contains sub-levels, then the sub-levels are displayed upon expansion. Upon expansion, any sub-levels will be displayed along with animation assets associated with the expanded level. As shown in FIG. 7, the animation assets associated with a tag may be displayed as an indented list underneath the lowest level of their respective hierarchies. For example, FIG. 7 shows parent node 701 representing the tag "CityBlock23" as a hierarchical level that may be expanded to show child nodes 703 and 705 representing tags "Building" and "Street" as sub-levels under "CityBlock23." The "Street" node 705 may also be expanded to display representations 707 and 709 of animation assets "cgl_lgt_ibl_spec_fur" and "cgl_lgt_key," respectively. This indicates that the two animation assets share the tag "CityBlock23:Street." Tree 700 also indicates that at least one animation asset has a tag containing the string "CityBlock23:Buildings," "CityBlock24," and "CityBlock25."

Figure 8:
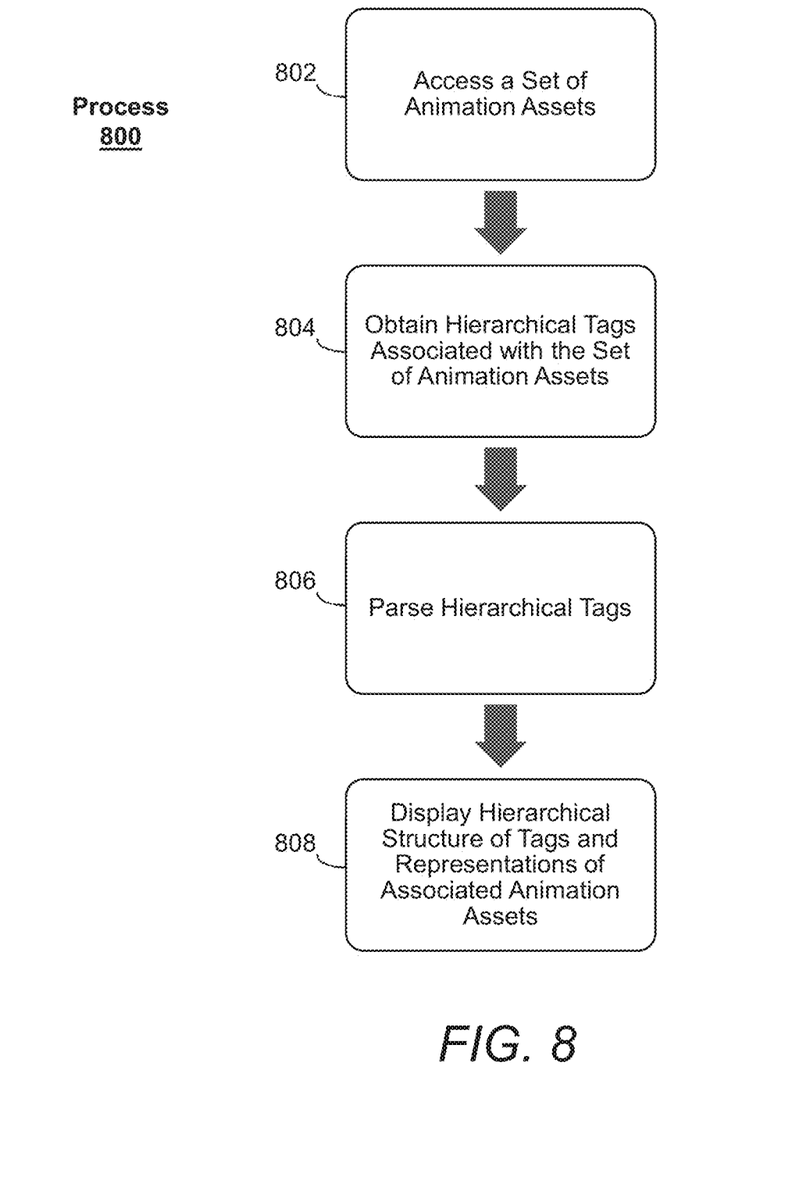
FIG. 8 illustrates an exemplary process for presenting animation assets in a hierarchical structure based on hierarchical tags.

FIG. 8 illustrates an exemplary process 800 for displaying hierarchical tags. At block 802, a set of animation assets may be accessed. The animation assets may be accessed from a database similar or identical to database 203. Asset configuration data that are associated with the animation assets, such as the visual properties and looks for an animation asset, may also be accessed. More preferably, however, configuration data is not loaded until an animation asset has been selected for editing or rendering in order to conserve processing resources, in which case, only metadata required to obtain the hierarchical tags of animation assets, such as an asset name or ID, is accessed.

At block 804, hierarchical tags associated with the set of accessed animation assets are obtained. The obtained hierarchical tags may be parsed at block 806 to identify hierarchies defined by the tags.

At block 808, a hierarchical structure of the tags and representations of the animation assets associated with the tags may be caused to be displayed. For example, as shown in FIG. 7, a tree format may be applied with icons representing the animation assets. The tree may present hierarchies based upon the hierarchical tags associated with animation assets. Presentation of hierarchical tags in tree format may be particularly advantageous for selecting groups of animation assets.

Once representations of the animation assets are displayed, animation assets may then be selected, obtained, and displayed for configuring a computer-generated scene according to blocks 608, 610, and 612 described above for process 600.

Another embodiment that would increase the utility of hierarchical tags allows a user to develop a rule for procedurally or statically partitioning animation assets into logical sets based upon hierarchical tags assigned to animation assets. According to this embodiment, the user selects a rule and enters a string to compare against animation asset tag strings. In response, animation assets associated with hierarchical tags matching the rule are displayed.

Figure 9:
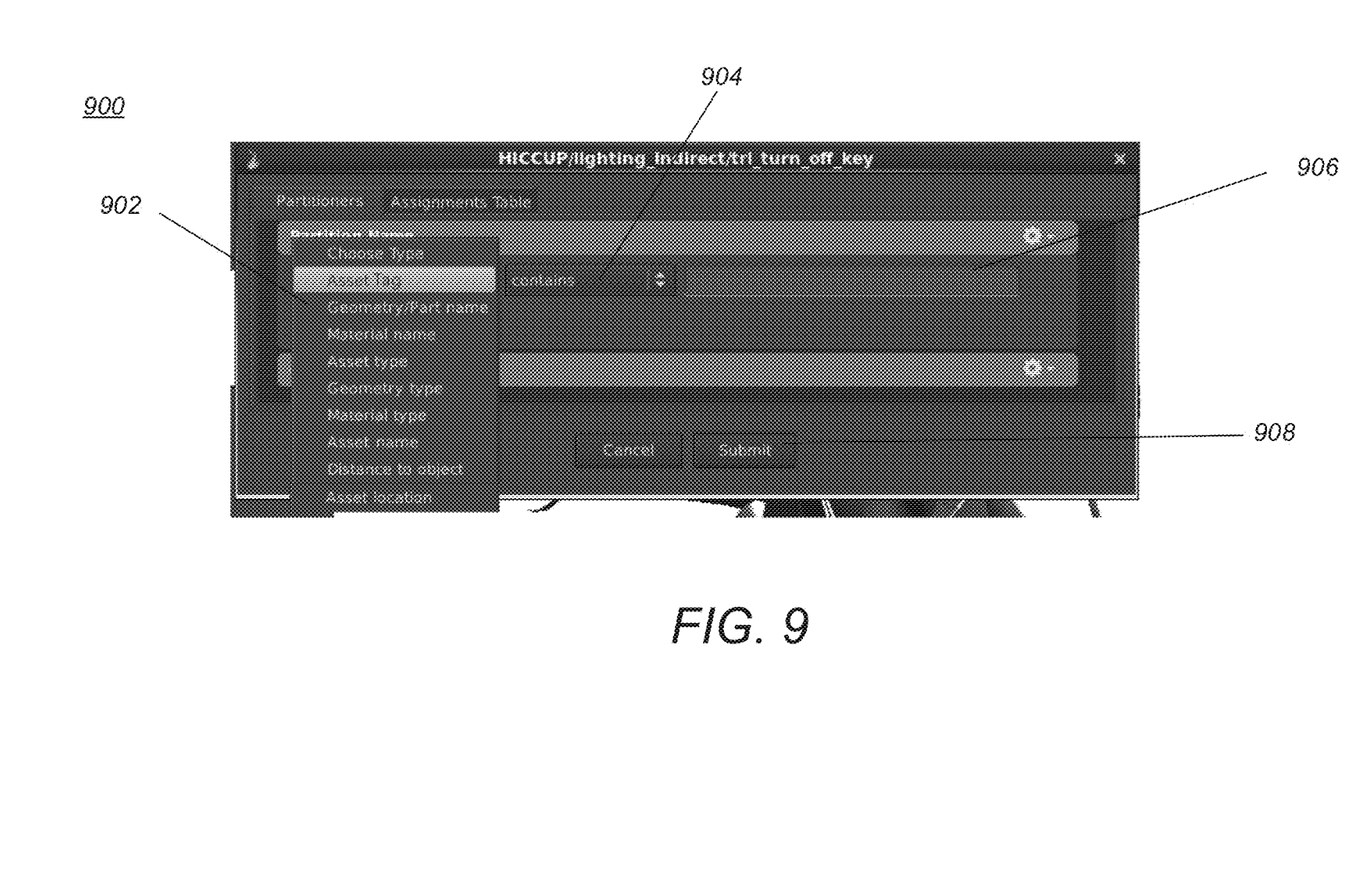
FIG. 9 illustrates an exemplary graphical user interface for creating a rule and matching a text string to hierarchical tags of animation assets.

FIG. 9 depicts a graphical user interface 900 for selecting a partition rule and a search term. FIG. 9 shows an option menu 902 of animation asset parameters that may be used to partition animation assets. In the user interface shown in FIG. 9, a user would select "Asset Tag" to partition animation assets based on a rule that depends on the hierarchical tags of existing animation assets. The user interface may include any known means for selecting a rule, such as a pull-down menu, drag-and-drop icons, or the like. The user interface also includes a menu 904 to choose the type of rule used to compare a string entered into box 906 with existing tags. When the submit button 908 is executed, the string entered in the field is checked against all hierarchical tags on all animation assets in order to find matches.

Figure 10:
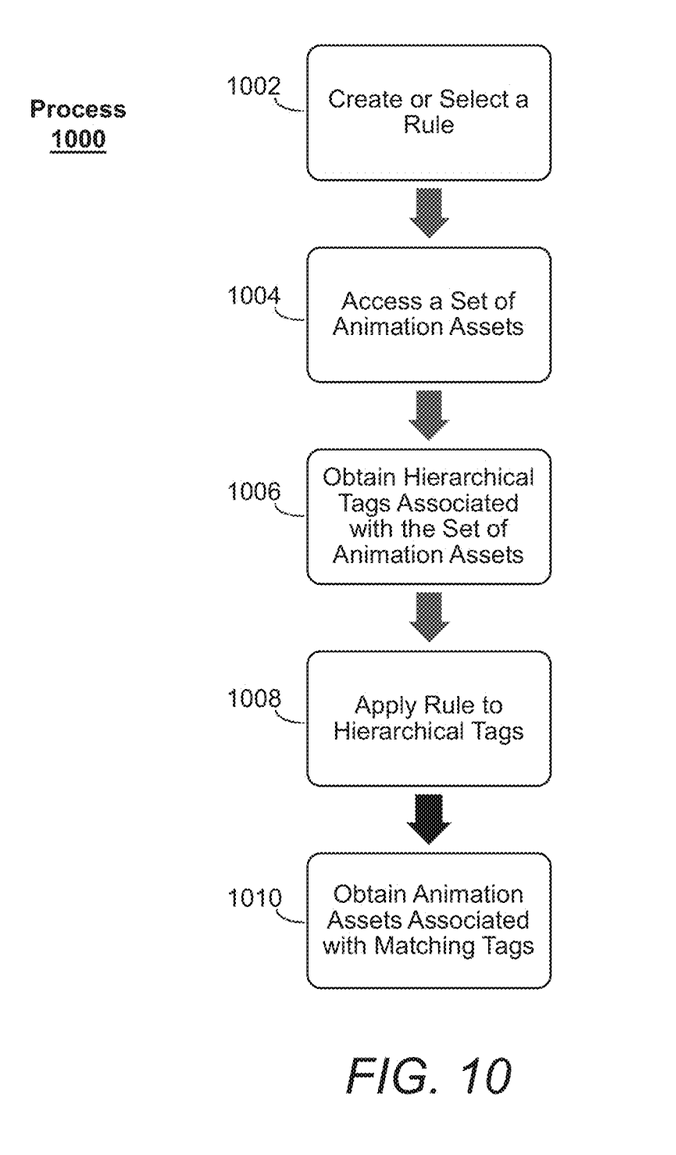
FIG. 10 illustrates an exemplary process for obtaining animation assets based on a partitioning rule.

FIG. 10 illustrates an exemplary process 1000 for using a rule to find and obtain animation assets based on hierarchical tags. At block 1002, a rule is created or selected. For example, a rule may require that an input string exactly match the string representing a hierarchical tag (i.e., a "match exactly" rule). Alternatively, a rule may require that a tag contain at least a part of an input string (i.e., a "contains" rule). A user interface may include any known means for selecting a rule, such as a pull-down menu, drag-and-drop icons, or the like.

At block 1004, a set of animation assets may be accessed. The user-selected animation assets may be accessed from a database similar or identical to database 203. At block 1006, any hierarchical tags associated with the animation asset are obtained. At block 1008, the rule established in block 1002 is applied to the obtained hierarchical tags to find ones that match the rule.

At block 1010, a set of animation assets associated with the matched tags may be obtained. Once obtained, the set of animation assets may be, for example, directly rendered, loaded into an editor for editing, or assembled with other animation assets for further processing. Compared to process 800, the rule-based process 1000 may be more useful if isolation of desired animation assets is the key objective because a user can search for a particular string instead of having to browse through a tree.

In some embodiments, prior to obtaining the set of animation assets at block 1010, a set of representations of the animation assets associated with the matched tags may be caused to be displayed. For example, the representations of the animation assets may be icons displayed in a simple list in a graphical user interface or the like. As with process 800, a hierarchy defined by the tags of the matching animation assets may also be displayed, for example, in a tree format. Once representations of the animation assets matching the search rule are displayed, the animation assets can then be selected, obtained, and displayed for configuring a computer-generated scene according to blocks 608, 610, and 612 described above for process 600.

Using arbitrary hierarchical tags according to the processes and systems described above advantageously allows the artist to associate some indicia of an animation asset so that it can be quickly identified and selected for editing and/or rendering. The methods help speed interaction with a computer-generated animation design system and speed up intermediate rendering by allowing an artist to easily locate and switch between animation assets during design, which in turn allows the artist to be more selective. Thus, the tags assist the artist or other user with identifying and selecting only animation assets of interest without having to configure the entire scene. The hierarchical tags may also allow the artist or other user to work with a simplified version of the scene that may omit animation assets having resource-intensive visual effects that are used in the final production rendering pass but that are not currently of interest to the animator.

Figure 11:
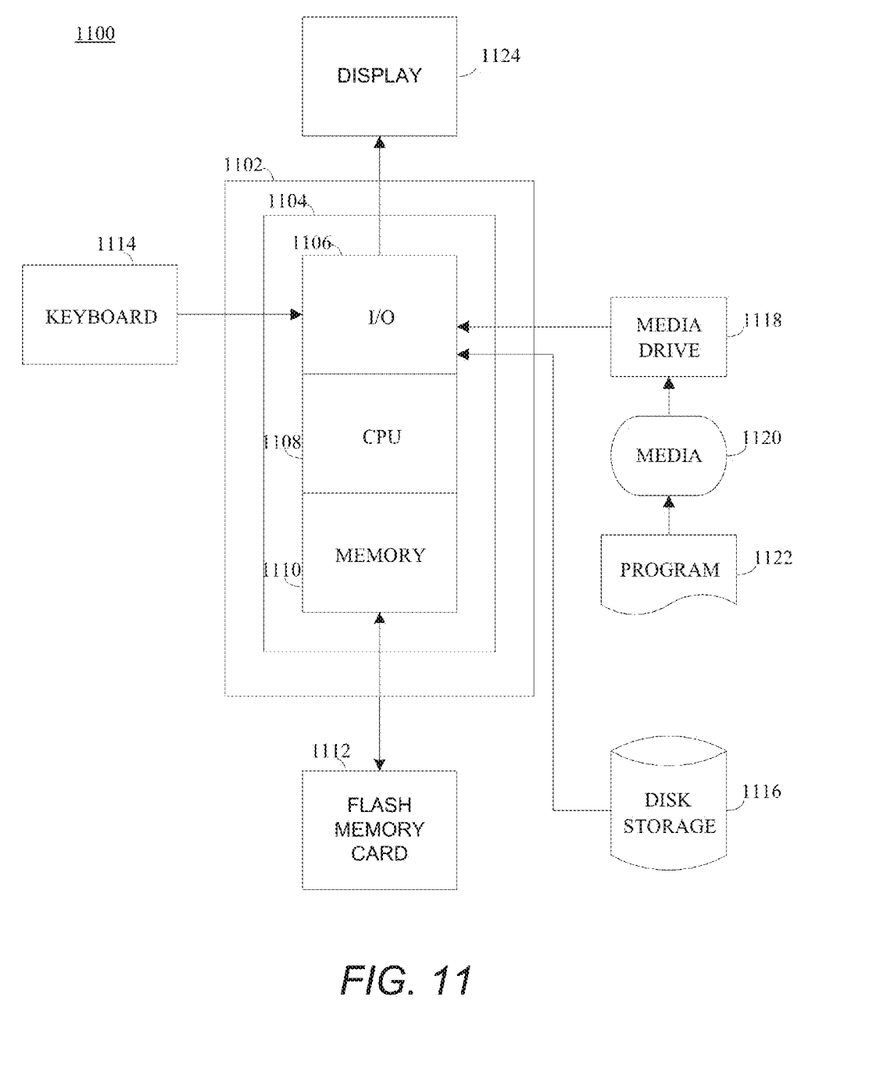
FIG. 11 illustrates an exemplary computing system.

FIG. 11 depicts computing system 1100 with a number of components that may be used to perform the above-described processes. The main system 1102 includes a motherboard 1104 having an I/O section 1106, one or more central processing units (CPUs) 1108, and a memory section 1110, which may have a flash memory card 1112 related to it. The I/O section 1106 is connected to a display 1124, a keyboard 1114, a disk storage unit 1116, and a media drive unit 1118. The media drive unit 1118 can read/write a computer-readable medium 1120, which can contain programs 1122 and/or data.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

Although only certain exemplary embodiments have been described in detail above, those skilled in the art will readily appreciate that many modifications are possible in the exemplary embodiments without materially departing from the novel teachings and advantages of this disclosure. Aspects of embodiments disclosed above can be combined in other combinations to form additional embodiments. All such modifications are intended to be included within the scope of this technology.

What is claimed is:

1. A computer-implemented method for creating a computer-generated animation, the method comprising:
  receiving a first user input representing a tag, wherein the tag is a string;
  determining an arbitrary hierarchy based on the tag, wherein the tag indicates a structure of the arbitrary hierarchy and a position within the arbitrary hierarchy;
  associating an animation asset of a plurality of animation assets with the tag;
  displaying the arbitrary hierarchy, wherein the arbitrary hierarchy includes a representation of the animation asset associated with the tag, and wherein the representation of the animation asset is displayed at the position within the arbitrary hierarchy indicated by the tag;
  receiving a second user input representing a selection of one or more animation assets of the plurality of animation assets;
  obtaining, in response to the second user input, the selected one or more animation assets; and
  displaying the selected one or more animation assets.

2. The method of claim 1, wherein one or more animation assets of the plurality of animation assets are each associated with a tag, the method further comprising:
  displaying a tree based on the one or more animation assets associated with a tag and their associated tags, wherein the tree corresponds to the arbitrary hierarchy.

3. The method of claim 2, further comprising:
displaying, at a first node of the tree, a representation of a first animation asset of the subset of the plurality of animation assets; and
displaying, at a second node of the tree, a representation of a second animation asset of the subset of the plurality of animation assets,
wherein the displaying of the representation of the first animation asset at the first node of the tree and the displaying of the representation of the second animation asset at the second node of the tree are based on the tags associated with the first animation asset and the second animation asset.

4. The method of claim 3, wherein:
when the tag of the first animation asset and the tag of the second animation asset begin with a common substring, the first node and the second node of the tree have the same parent node.

5. The method of claim 1, further comprising:
receiving a third user input, wherein the third user input represents a search rule;
receiving a fourth user input, wherein the fourth user input is a search string;
searching a plurality of tags based on the search rule and the search string, wherein each tag of the plurality of tags is associated with one or more animation assets of the plurality of animation assets; and
obtaining at least one animation asset of the plurality of animation assets based on the search.

6. The method of claim 1, further comprising:
performing an animation process on the selected one or more animation assets, wherein the animation process is one or more of a rendering process, lighting process, shading process, or rasterizing process.

7. The method of claim 1, further comprising:
receiving a user selection of a visual lighting effect for the selected one or more animation assets; and
rendering an image of the selected one or more animation assets, wherein the image is rendered based on the selected visual lighting effect.

8. A non-transitory computer-readable storage medium comprising computer-executable instructions for creating a computer-generated animation, the computer-executable instructions comprising instructions for:
receiving a first user input representing a tag, wherein the tag is a string;
determining an arbitrary hierarchy based on the tag, wherein the tag indicates a structure of the arbitrary hierarchy and a position within the arbitrary hierarchy;
associating an animation asset of a plurality of animation assets with the tag;
displaying the arbitrary hierarchy, wherein the arbitrary hierarchy includes a representation of the animation asset associated with the tag, and wherein the representation of the animation asset is displayed at the position within the arbitrary hierarchy indicated by the tag;
receiving a second user input representing a selection of one or more animation assets of the plurality of animation assets;
obtaining, in response to the second user input, the selected one or more animation assets; and
displaying the selected one or more animation assets.

9. The non-transitory computer-readable storage medium of claim 8, wherein one or more animation assets of the plurality of animation assets are each associated with a tag, the computer-executable instructions further comprising instructions for:
displaying a tree based on the one or more animation assets associated with a tag and their associated tags, wherein the tree corresponds to the arbitrary hierarchy.

10. The non-transitory computer-readable storage medium of claim 9, further comprising instructions for:
displaying, at a first node of the tree, a representation of a first animation asset of the subset of the plurality of animation assets; and
displaying, at a second node of the tree, a representation of a second animation asset of the subset of the plurality of animation assets,
wherein the displaying of the representation of the first animation asset at the first node of the tree and the displaying of the representation of the second animation asset at the second node of the tree are based on the tags associated with the first animation asset and the second animation asset.

11. The non-transitory computer-readable storage medium of claim 10, wherein:
when the tag of the first animation asset and the tag of the second animation asset begin with a common substring, the first node and the second node of the tree have the same parent node.

12. The non-transitory computer-readable storage medium of claim 8, further comprising instructions for:
receiving a third user input, wherein the third user input represents a search rule;
receiving a fourth user input, wherein the fourth user input is a search string;
searching a plurality of tags based on the search rule and the search string, wherein each tag of the plurality of tags is associated with one or more animation assets of the plurality of animation assets; and
obtaining at least one animation asset of the plurality of animation assets based on the search.

13. The non-transitory computer-readable storage medium of claim 8, further comprising instructions for:
performing an animation process on the selected one or more animation assets, wherein the animation process is one or more of a rendering process, lighting process, shading process, or rasterizing process.

14. The non-transitory computer-readable storage medium of claim 8, further comprising instructions for:
receiving a user selection of a visual lighting effect for the selected one or more animation assets; and
rendering an image of the selected one or more animation assets, wherein the image is rendered based on the selected visual lighting effect.

15. An apparatus for creating a computer-generated animation, the apparatus comprising:
a memory configured to store an animation asset; and
a computer processor configured to:
receive a first user input representing a tag, wherein the tag is a string;
determine an arbitrary hierarchy based on the tag, wherein the tag indicates a structure of the arbitrary hierarchy and a position within the arbitrary hierarchy;
associate an animation asset of a plurality of animation assets with the tag;
display the arbitrary hierarchy, wherein the arbitrary hierarchy includes a representation of the animation asset associated with the tag, and wherein the representation of the animation asset is displayed at the position within the arbitrary hierarchy indicated by the tag;

receive a second user input representing a selection of one or more animation assets of the plurality of animation assets;

obtain, in response to the second user input, the selected one or more animation assets; and display the selected one or more animation assets.

16. The apparatus of claim 15, wherein one or more animation assets of the plurality of animation assets are each associated with a tag, the computer processor further configured to:

display a tree based on the one or more animation assets associated with a tag and their associated tags, wherein the tree corresponds to the arbitrary hierarchy.

17. The apparatus of claim 16, wherein the computer processor is further configured to:

display, at a first node of the tree, a representation of a first animation asset of the subset of the plurality of animation assets; and display, at a second node of the tree, a representation of a second animation asset of the subset of the plurality of animation assets, wherein the display of the representation of the first animation asset at the first node of the tree and the display of the representation of the second animation asset at the second node of the tree are based on the tags associated with the first animation asset and the second animation asset.

18. The apparatus of claim 17, wherein:

when the tag of the first animation asset and the tag of the second animation asset begin with a common substring, the first node and the second node of the tree have the same parent node.

19. The apparatus of claim 15, wherein the computer processor is further configured to:

receive a third user input, wherein the third user input represents a search rule;

receive a fourth user input, wherein the fourth user input is a search string;

search a plurality of tags based on the search rule and the search string, wherein each tag of the plurality of tags is associated with one or more animation assets of the plurality of animation assets; and obtain at least one animation asset of the plurality of animation assets based on the search.

20. The apparatus of claim 15, wherein the computer processor is further configured to:

perform an animation process on the selected one or more animation assets, wherein the animation process is one or more of a rendering process, lighting process, shading process, or rasterizing process.

21. The apparatus of claim 15, wherein the computer processor is further configured to:

receive a user selection of a visual lighting effect for the selected one or more animation assets; and render an image of the selected one or more animation assets, wherein the image is rendered based on the selected visual lighting effect.

* * * * *